US 6,745,729 B1

(12) United States Patent
Ebanks

(10) Patent No.: US 6,745,729 B1
(45) Date of Patent: Jun. 8, 2004

(54) INTERNAL COMBUSTION ENGINE SYSTEM

(76) Inventor: Derron E. Ebanks, 12648 NW. 11th Ct., Sunrise, FL (US) 33323

( * ) Notice: Subject to any disclaimer, the term of this patent is extended or adjusted under 35 U.S.C. 154(b) by 0 days.

(21) Appl. No.: 10/412,833

(22) Filed: Apr. 15, 2003

(51) Int. Cl.[7] ............................................... F02B 75/02
(52) U.S. Cl. .................................... 123/52.4; 123/533
(58) Field of Search ............................ 123/52.4, 195 P, 123/533, 26; 60/517; 417/515

(56) References Cited

U.S. PATENT DOCUMENTS

| 3,570,459 | A |   | 3/1971  | Combs |
|-----------|---|---|---------|-------|
| 3,805,752 | A | * | 4/1974  | Cataldo ........................ 123/26 |
| D252,148  | S |   | 6/1979  | Schramm et al. |
| 4,255,929 | A | * | 3/1981  | Frosch et al. .................. 60/517 |
| 4,781,155 | A |   | 11/1988 | Brücker |
| 5,638,777 | A |   | 6/1997  | Van Avermaete |
| 5,769,039 | A | * | 6/1998  | Taue et al. .................. 123/52.4 |
| 5,778,833 | A | * | 7/1998  | Kuranishi ................... 123/52.4 |
| 5,853,308 | A | * | 12/1998 | Nanami et al. ........... 440/89 R |
| 5,884,611 | A |   | 3/1999  | Tarr et al. |
| 6,145,496 | A |   | 11/2000 | Pace et al. |
| 6,200,111 | B1 | * | 3/2001 | Foss ........................... 417/515 |
| 6,508,223 | B2 | * | 1/2003 | Laimbock et al. ........ 123/195 P |

* cited by examiner

Primary Examiner—Marguerite McMahon

(57) ABSTRACT

An internal combustion engine system for providing better fuel economy and fewer toxic emissions. The internal combustion engine system includes an engine assembly including an engine casing having first and second rows of chambers, and also including pistons being slidably disposed in the chambers, and further including first linkages being pivotally connected to the pistons, and also including second linkages being pivotally connected to the first linkages, and further including a first crankshaft being attached to a selected second linkages and being driven by the pistons in the first row of the chambers, and also including a second crankshaft being attached to other selected second linkages and being driven by the pistons in the second row of said chambers, and further including a drive shaft being actuated by the first and second crankshafts for driving a flywheel, in particular; and also includes a valve assembly including injectors for injecting fuel into the chambers; and further includes a fuel supply assembly for supplying fuel to the chambers through the valve assembly.

8 Claims, 5 Drawing Sheets

INTERNAL COMBUSTION ENGINE SYSTEM

BACKGROUND OF THE INVENTION

1. Field of the Invention

The present invention relates to vehicle engine systems and more particularly pertains to a new internal combustion engine system for providing better fuel economy and fewer toxic emissions.

2. Description of the Prior Art

The use of vehicle engine systems is known in the prior art. More specifically, vehicle engine systems heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. Nos. 5,638,777; 4,781,155; 3,570,459; 5,884,611; 6,145,496; and U.S. Pat. No. Des. 252,148.

While these devices fulfill their respective, particular objectives and requirements, the aforementioned patents do not disclose a new internal combustion engine system. The prior art includes various types of engines having pistons, crankshafts, and drive shafts.

SUMMARY OF THE INVENTION

The general purpose of the present invention, which will be described subsequently in greater detail, is to provide a new internal combustion engine system which has many of the advantages of the vehicle engine systems mentioned heretofore and many novel features that result in a new internal combustion engine system which is not anticipated, rendered obvious, suggested, or even implied by any of the prior art vehicle engine systems, either alone or in any combination thereof. The present invention includes an engine assembly including an engine casing having first and second rows of chambers, and also including pistons being slidably disposed in the chambers, and further including first linkages being pivotally connected to the pistons, and also including second linkages being pivotally connected to the first linkages, and further including a first crankshaft being attached to a selected second linkages and being driven by the pistons in the first row of the chambers, and also including a second crankshaft being attached to other selected second linkages and being driven by the pistons in the second row of said chambers, and further including a drive shaft being actuated by the first and second crankshafts for driving a flywheel, in particular; and also includes a valve assembly including injectors for injecting fuel into the chambers; and further includes a fuel supply assembly for supplying fuel to the chambers through the valve assembly. None of the prior art includes the combination of the elements of the present invention.

There has thus been outlined, rather broadly, the more important features of the internal combustion engine system in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

It is an object of the present invention to provide a new internal combustion engine system which has many of the advantages of the vehicle engine systems mentioned heretofore and many novel features that result in a new internal combustion engine system which is not anticipated, rendered obvious, suggested, or even implied by any of the prior art vehicle engine systems, either alone or in any combination thereof.

Still another object of the present invention is to provide a new internal combustion engine system for providing better fuel economy and fewer toxic emissions.

Still yet another object of the present invention is to provide a new internal combustion engine system that uses a double crankshaft and special pressurized fuel.

Even still another object of the present invention is to provide a new internal combustion engine system that produces more power and uses less fuel.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
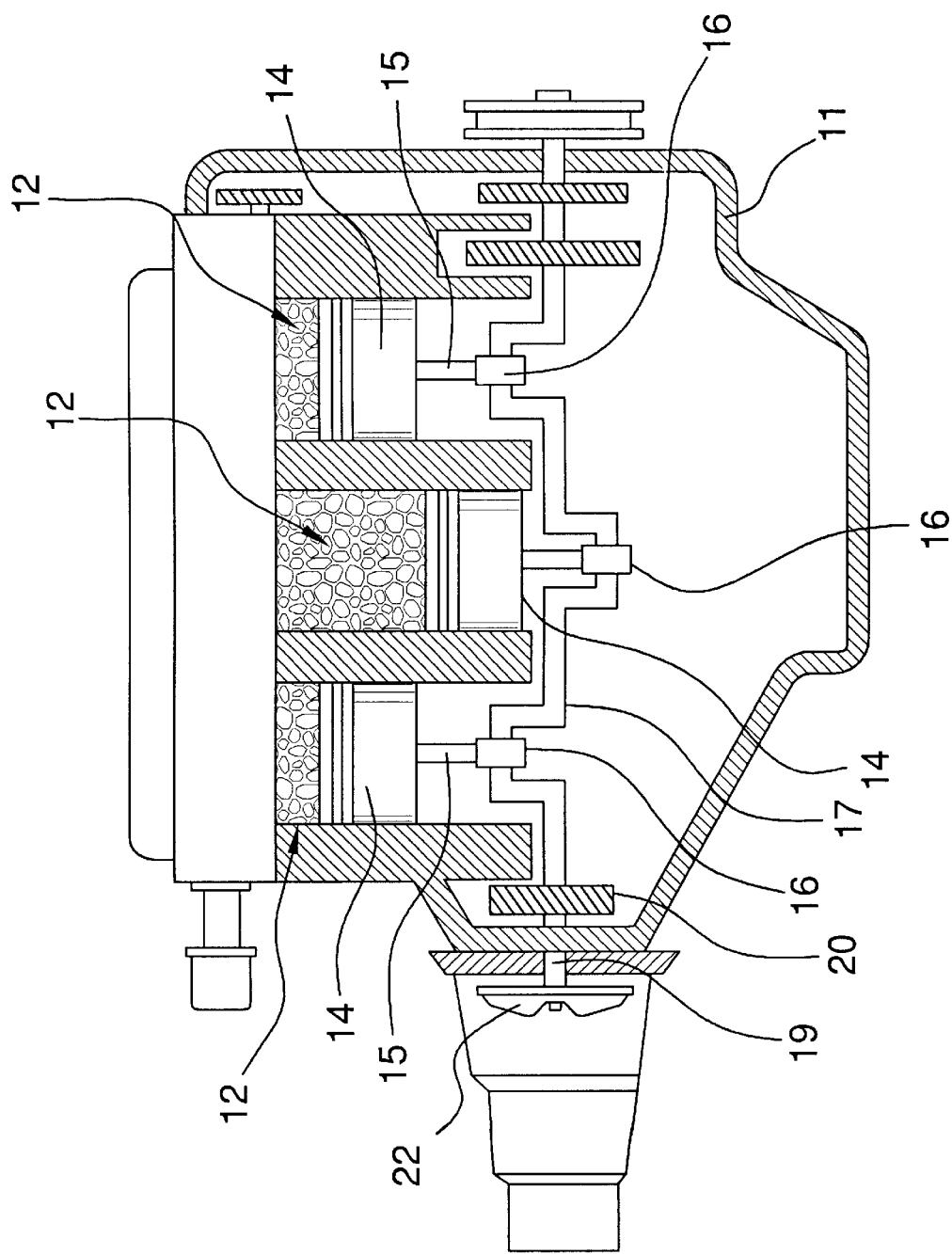
FIG. 1 is a longitudinal cross-sectional view of an engine casing of a new internal combustion engine system according to the present invention.
Figure 2:
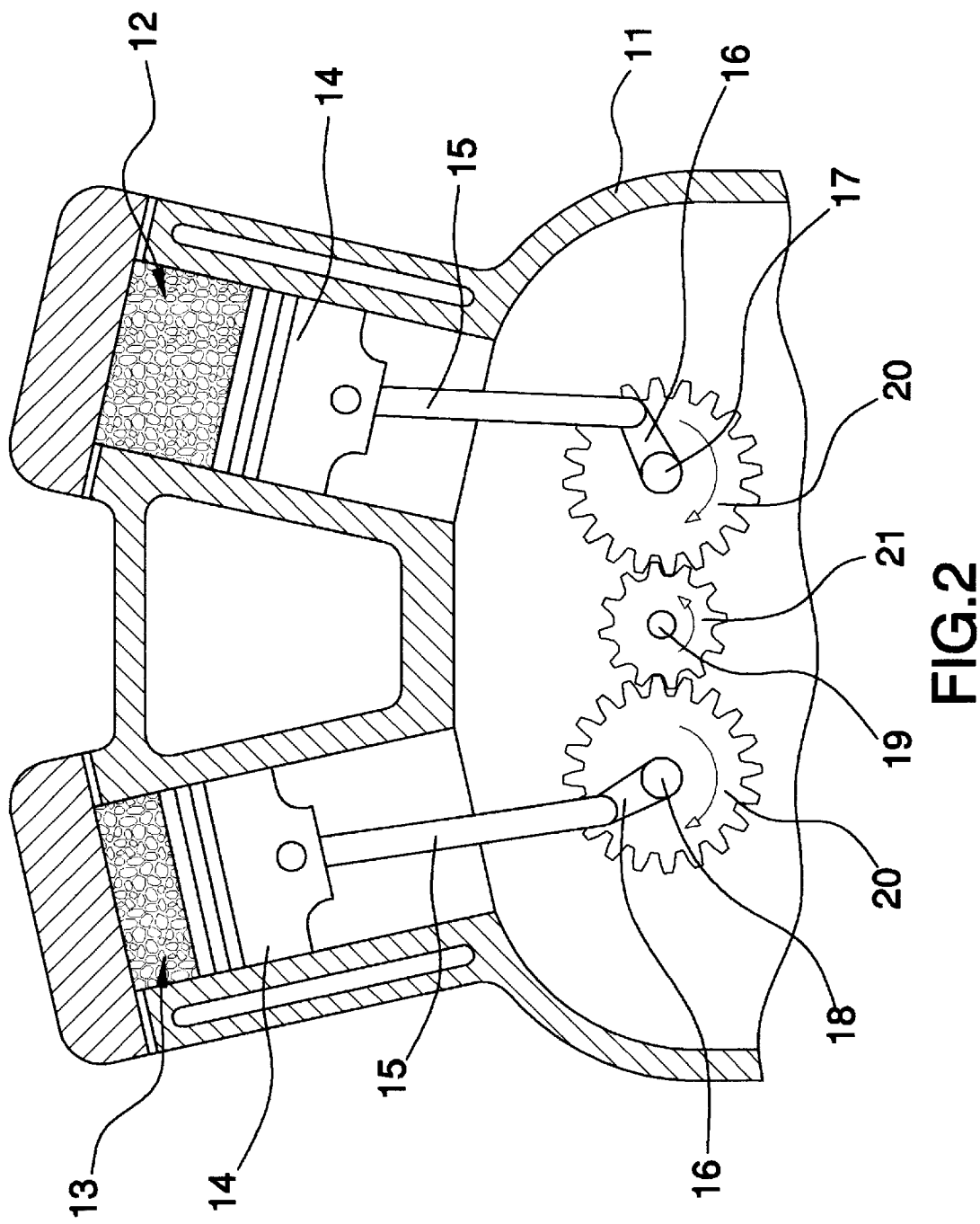
FIG. 2 is a lateral cross-sectional view of the engine casing of the present invention.
Figure 3:
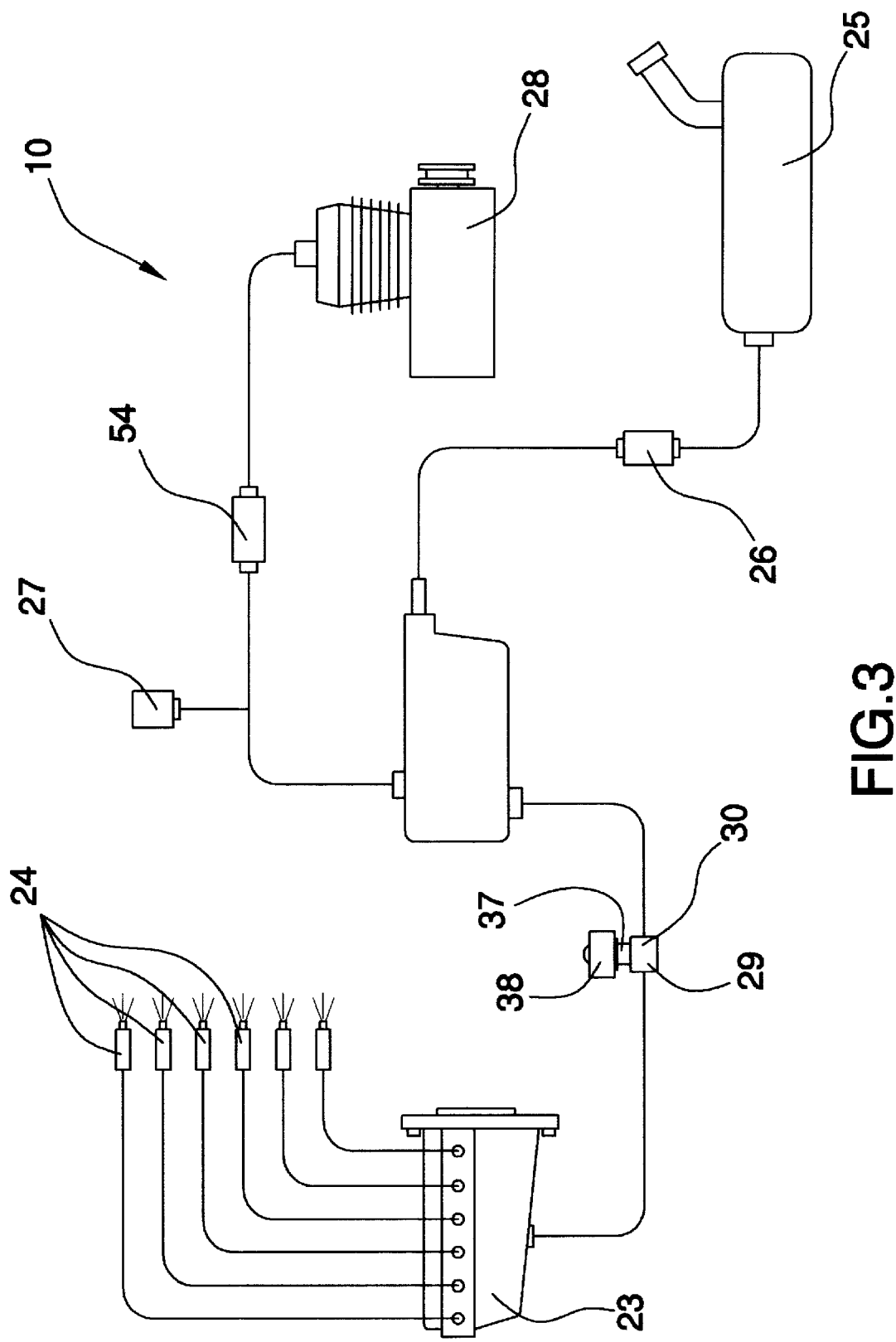
FIG. 3 is a diagram of the present invention.
Figure 4:
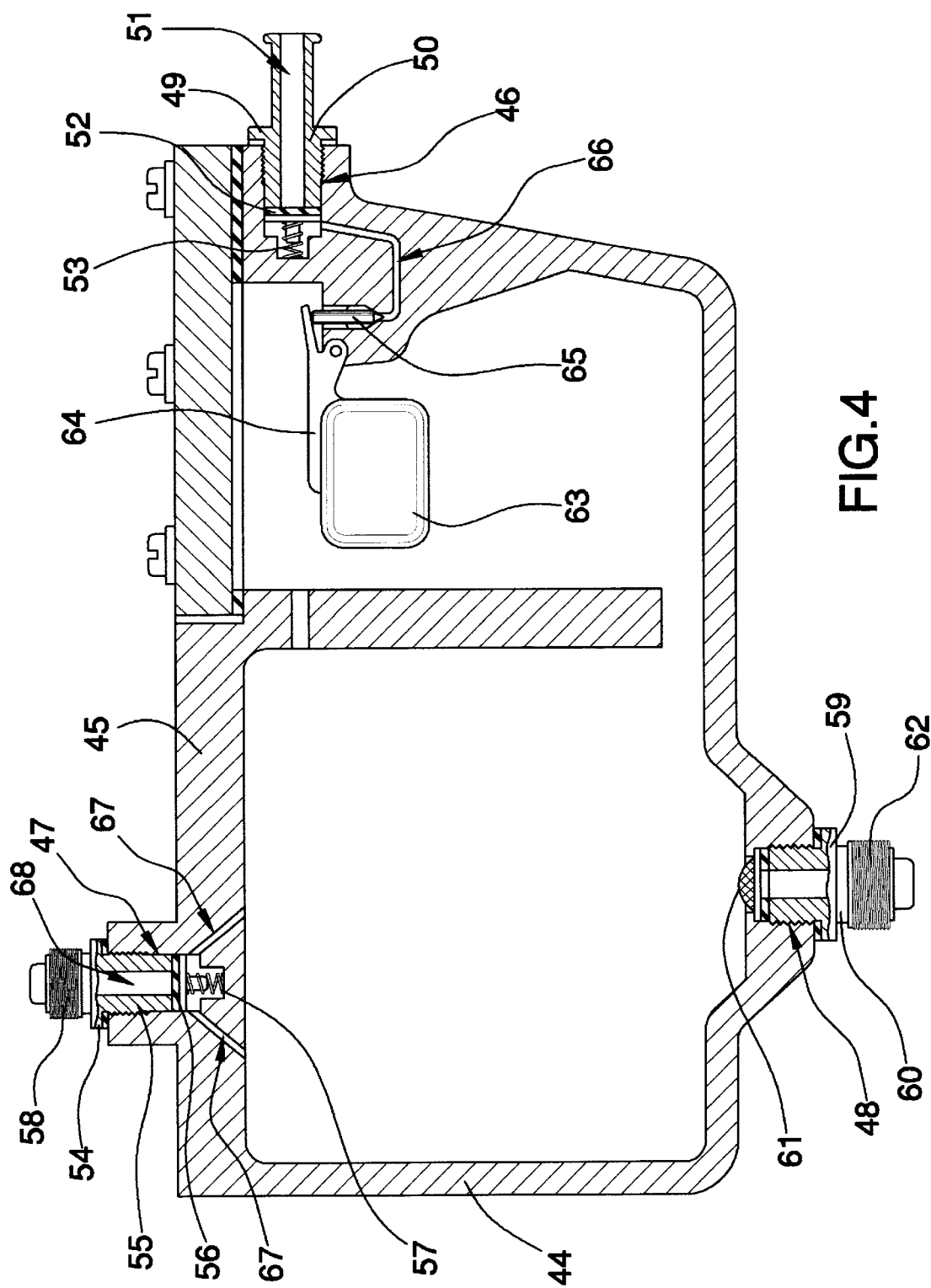
FIG. 4 is a cross-sectional view of a fuel mixing tank of the present invention.
Figure 5:
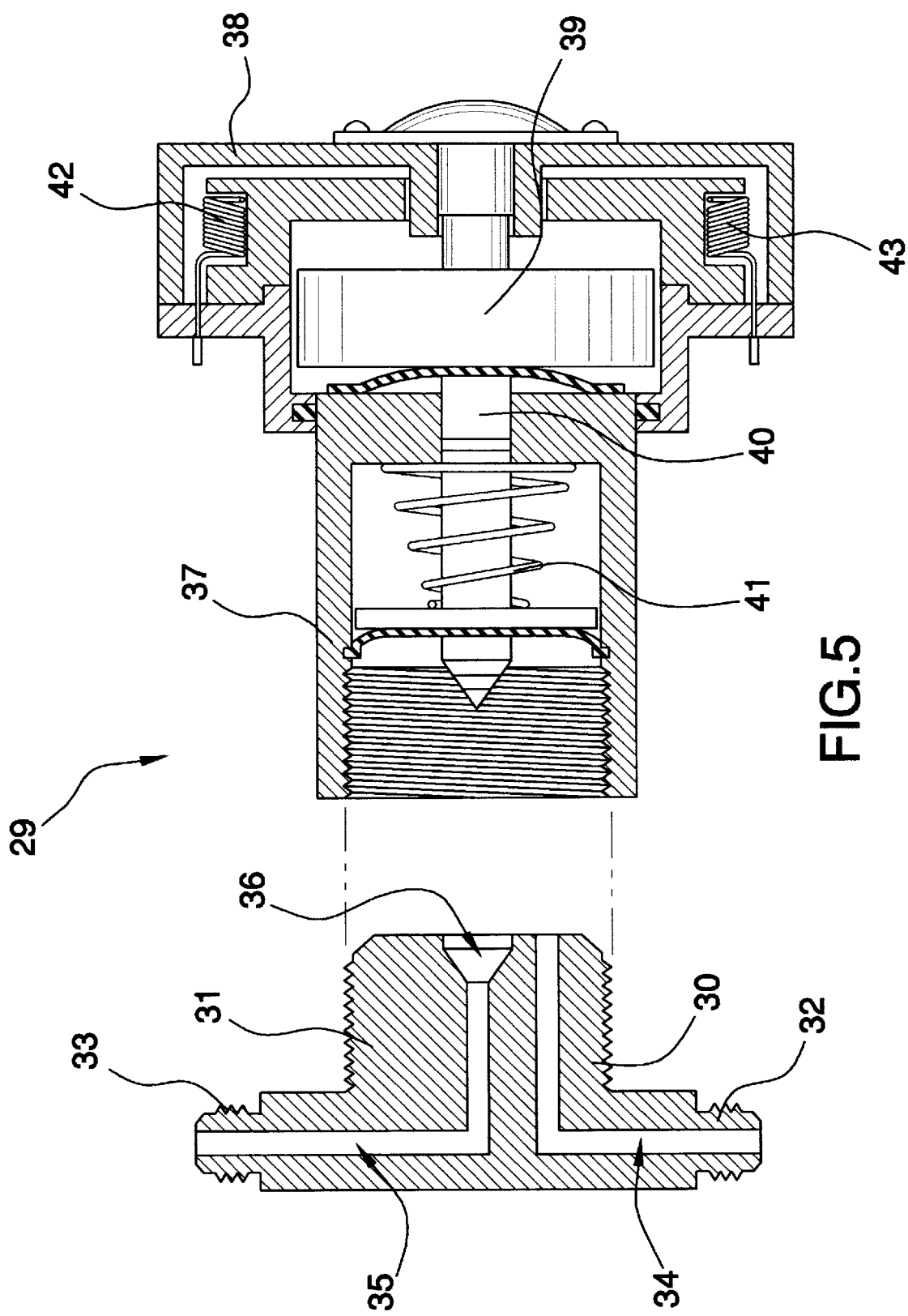
FIG. 5 is a cross-sectional view of an electromagnetic switch of the present invention.

With reference now to the drawings, and in particular to FIGS. 1 through 5 thereof, a new internal combustion engine system embodying the principles and concepts of the present invention and generally designated by the reference numeral 10 will be described.

As best illustrated in FIGS. 1 through 5, the internal combustion engine system 10 generally comprises an engine assembly including an engine casing 11 having first and second rows of chambers 12,13, and also including pistons 14 being slidably disposed in the chambers 12,13, and further including first linkages 15 being pivotally and securely connected to the pistons 14, and also including second linkages 16 being pivotally and securely connected to the first linkages 15, and further including a first crankshaft 17 being securely attached to selected second linkages 16 and being driven by the pistons 14 in the first row of the chambers 12, and also including a second crankshaft 18 being securely attached to other selected second linkages 16 and being driven by the pistons 14 in the second row of the chambers 13, and further including a drive shaft 19 being actuated by the first and second crankshafts 17,18 for driving a flywheel 22, in particular. The first and second crankshafts 17,18 are spacedly disposed parallel to one another. The drive shaft 19 is disposed between the first and second crankshafts 17,18. The engine assembly also includes crankshaft gears 20 being securely mounted about the first and second crankshafts 17,18, and further includes a drive gear 21 being securely mounted about the drive shaft 19 and being engaged to the crankshaft gears 20. A valve assembly includes a valve body 23 and injectors 24 for injecting fuel into the chambers 17,18.

A fuel supply assembly for supplying fuel to the chambers 17,18 through the valve assembly includes a fuel tank 25, a fuel pump 26 being securely connected to the fuel tank 25 for pumping fuel from the fuel tank 25, a mixing tank assembly being securely connected to the fuel pump 26 for mixing the fuel with compressed air, a compressor lock switch 27 being securely connected to the mixing tank assembly, an air compressor 28 being securely connected to the compressor lock switch 27 for providing compressed air to the mixing tank assembly and being turned off by the compressor lock switch 27, and an electromagnetic switch 29 interconnecting the mixing tank assembly and the valve assembly. The electromagnetic switch 29 includes a connector member 30 having a threaded main portion 31, and also having a threaded inlet nipple portion 32 being connected to the mixing tank assembly and a threaded outlet nipple portion 33 being connected to the valve assembly, and further having a first fuel line 34 being disposed through the threaded inlet nipple portion 32 and the threaded main portion 31, and also having a second fuel line 35 being disposed through the threaded main portion 31 and through the threaded outlet nipple portion 33; and also includes a tubular housing 37 being threaded upon the threaded main portion 31 of the connector member 30; and further includes a cap member 38 being securely mounted upon the tubular housing 37; and also includes a valve stem support member 39 being movably disposed in the cap member 38; and further includes a valve stem 40 being securely attached to the valve stem support member 39 and being biasedly retracted from a valve seat 36 in the second fuel line 35 to prevent fuel from flowing through the second fuel line 35 to the valve assembly; and also includes a spring member 41 being securely disposed about the valve stem 40 for biasing the valve stem 40 out of the valve seat 36; and further includes electromagnetic coils 42,43 being securely disposed in the cap member 38 for urging the valve stem 40 into the valve seat 40 and being adapted to be connected to an energy source for the energizing thereof.

The mixing tank assembly includes a mixing tank 44 having a fuel inlet port 46 being disposed through a wall 45 of the mixing tank for receiving fuel from the fuel pump 26, and further having an air inlet port 47 also being disposed through the wall 45 of the mixing tank 44 for receiving compressed air from the air compressor 28, and also having an outlet port 48 being disposed through the wall 45 of the mixing tank 44; and further includes a fuel valve 49 being movably and securely disposed in the fuel inlet port 46, and also includes an air valve 54 being movably and securely disposed in the air inlet port 47; and further includes a valve connector plug 59 being securely disposed in the outlet port 48; and also includes a float member being securely disposed in the mixing tank 44. The mixing tank 44 includes a fuel line 66 being disposed in the wall 45 of the mixing tank 44 and extending from the fuel inlet port 46 into the mixing tank 44, and also includes air lines 67 being disposed in the wall 45 of the mixing tank 44 and extending from the air inlet port 47 into the mixing tank 44. The fuel valve 49 includes a first valve body 50 being threaded into the fuel inlet port 46 and having a bore 51 being disposed therethrough, and also includes a first stopper plug 52 being movably and securely disposed in the fuel inlet port 46 for closing the fuel line 66, and further includes a first spring 53 being securely disposed in the fuel inlet port 46 and biasing the first stopper plug 52 against the first valve body 50 to close the fuel line 66.

The air valve 54 includes a second valve body 55 being threaded into the air inlet port 47 and having a bore 68 being disposed therethrough, and also includes a second stopper plug 56 being movably and securely disposed in the air inlet port 47 for closing the air lines 67, and further includes a second spring 57 being securely disposed in the air inlet port 47 and biasing the second stopper plug 56 against the second valve body 55 to close the air lines 67, and also includes a first threaded collar 58 being securely disposed about the second valve body 55 for connecting to the air compressor 28. The valve connector plug 59 includes a plug body 60 being threaded into the outlet port 48 and having a bore extending therethrough, and also includes a screen 61 being disposed in the mixing tank 44 and being securely attached to an end of the plug body 60, and further includes a second threaded collar 62 being securely disposed about the plug body 60.

The float member includes a floatation member 63 being securely disposed in the mixing tank 44, and also includes a lever 64 being hingedly attached to the floatation member 63, and further includes a plug member 65 being movably disposed in and out of the fuel line 66 and being engageable to the lever 66 which urges the plug member 65 into the fuel line 66 upon the mixing fuel being filled with fuel and compressed air.

In use, the air compressor 28 provides compressed air to the mixing tank 44, and the fuel pump 26 provides fuel to the mixing tank 44; whereupon a mixture of compressed air and fuel is effectively moved from the mixing tank 44 through the electromagnetic switch 29 and to the valve assembly and into the first and second rows of chambers 12,13 in the engine casing 11, and is ignited in the chambers 12,13 causing the pistons 14 to move back and forth thus causing rotation of the first and second crankshafts 17,18 and rotation of the drive shaft 19 which turns the flywheel 22 and any pulleys mounted thereto. The mixture of the fuel and compressed air reduced fuel consumption and the dual crankshafts 17,18 provide added power and torque for driving the vehicle.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the internal combustion engine system. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. An internal combustion engine system comprising:

an engine assembly including an engine casing having first and second rows of chambers, and also including pistons being slidably disposed in said chambers, and further including first linkages being pivotally connected to said pistons, and also including second linkages being pivotally connected to said first linkages, and further including a first crankshaft being attached to selected said second linkages and being driven by said pistons in said first row of said chambers, and also including a second crankshaft being attached to other selected said second linkages and being driven by said pistons in said second row of said chambers, and further including a drive shaft being actuated by said first and second crankshafts for driving a flywheel and pulleys, said first and second crankshafts being spacedly disposed parallel to one another, said drive shaft being disposed between said first and second crankshafts, said engine assembly also including crankshaft gears being mounted about said first and second crankshafts, and further including a drive gear being mounted about said drive shaft and being engaged to said crankshaft gears;

a valve assembly including injectors for injecting fuel into said chambers;

a fuel supply assembly for supplying fuel to said chambers through said valve assembly, said fuel supply assembly including a fuel tank, a fuel pump being connected to said fuel tank for pumping fuel from said fuel tank, a mixing tank assembly being connected to said fuel pump for mixing the fuel with compressed air, a compressor lock switch being connected to said mixing tank assembly, an air compressor being connected to said compressor lock switch for providing compressed air to said mixing tank assembly, and an electromagnetic switch interconnecting said mixing tank assembly and said valve assembly.

2. The internal combustion engine system as described in claim 1 wherein said electromagnetic switch includes a connector member having a threaded main portion, and also having a threaded inlet nipple portion being connected to said mixing tank assembly and further having a threaded outlet nipple portion being connected to said valve assembly, and further having a first fuel line being disposed through said threaded inlet nipple portion and said threaded main portion, and also having a second fuel line being disposed through said threaded main portion and through said threaded outlet nipple portion; and also includes a tubular housing being threaded upon said threaded main portion of said connector member; and further includes a cap member being securely mounted upon said tubular housing; and also includes a valve stem support member being movably disposed in said cap member; and further includes a valve stem being attached to said valve stem support member and being biasedly retracted from a valve seat in said second fuel line for preventing fuel to flow from said mixing assembly to said valve assembly; and also includes a spring member being disposed about said valve stem for biasing said valve stem out of said valve seat; and further includes electromagnetic coils being disposed in said cap member for urging said valve stem into said valve seat and being adapted to be connected to an energy source for the energizing thereof.

3. The internal combustion engine system as described in claim 1 wherein said mixing tank assembly includes a mixing tank having a fuel inlet port being disposed through a wall of said mixing tank for receiving fuel from said fuel pump, and further having an air inlet port also being disposed through a wall of said mixing tank for receiving compressed air from said air compressor, and also having an outlet port being disposed through a wall of said mixing tank; and further includes a fuel valve being movably disposed in said fuel inlet port; and also includes an air valve being movably disposed in said air inlet port; and further includes a valve connector plug being disposed in said outlet port; and also includes a float member being disposed in said mixing tank.

4. The internal combustion engine system as described in claim 3 wherein said mixing tank includes a fuel line being disposed in said wall of said mixing tank and extending from said fuel inlet port into said mixing tank, and also includes air lines being disposed in said wall of said mixing tank and extending from said air inlet port into said mixing tank.

5. The internal combustion engine system as described in claim 4 wherein said fuel valve includes a first valve body being threaded into said fuel inlet port and having a bore being disposed therethrough, and also includes a first stopper plug being movably disposed in said fuel inlet port for closing said fuel line, and further includes a first spring being disposed in said fuel inlet port and biasing said first stopper plug against said first valve body to close said fuel line.

6. The internal combustion engine system as described in claim 5 wherein said air valve includes a second valve body being threaded into said air inlet port and having a bore being disposed therethrough, and also includes a second stopper plug being movably disposed in said air inlet port for closing said air line, and further includes a second spring being disposed in said air inlet port and biasing said second stopper plug against said second valve body to close said air line, and also includes a first threaded collar being disposed about said second valve body for connecting to said air compressor.

7. The internal combustion engine system as described in claim 6 Wherein said valve connector plug includes a plug body being threaded into said outlet port and having a bore extending therethrough, and also includes a screen being disposed in said mixing tank and being attached to an end of said plug body, and further includes a second threaded collar being disposed about said plug body.

8. The internal combustion engine system as described in claim 7 wherein said float member includes a floatation member being disposed in said mixing tank, and also includes a lever being hingedly attached to said floatation member, and further includes a plug member being movably disposed in and out of said fuel line being engageable to said lever for urging said lug member into said fuel line.

* * * * *